Nov. 14, 1950     G. APPEL     2,530,216
CORN AND CALLOUS REMOVER
Filed June 26, 1945
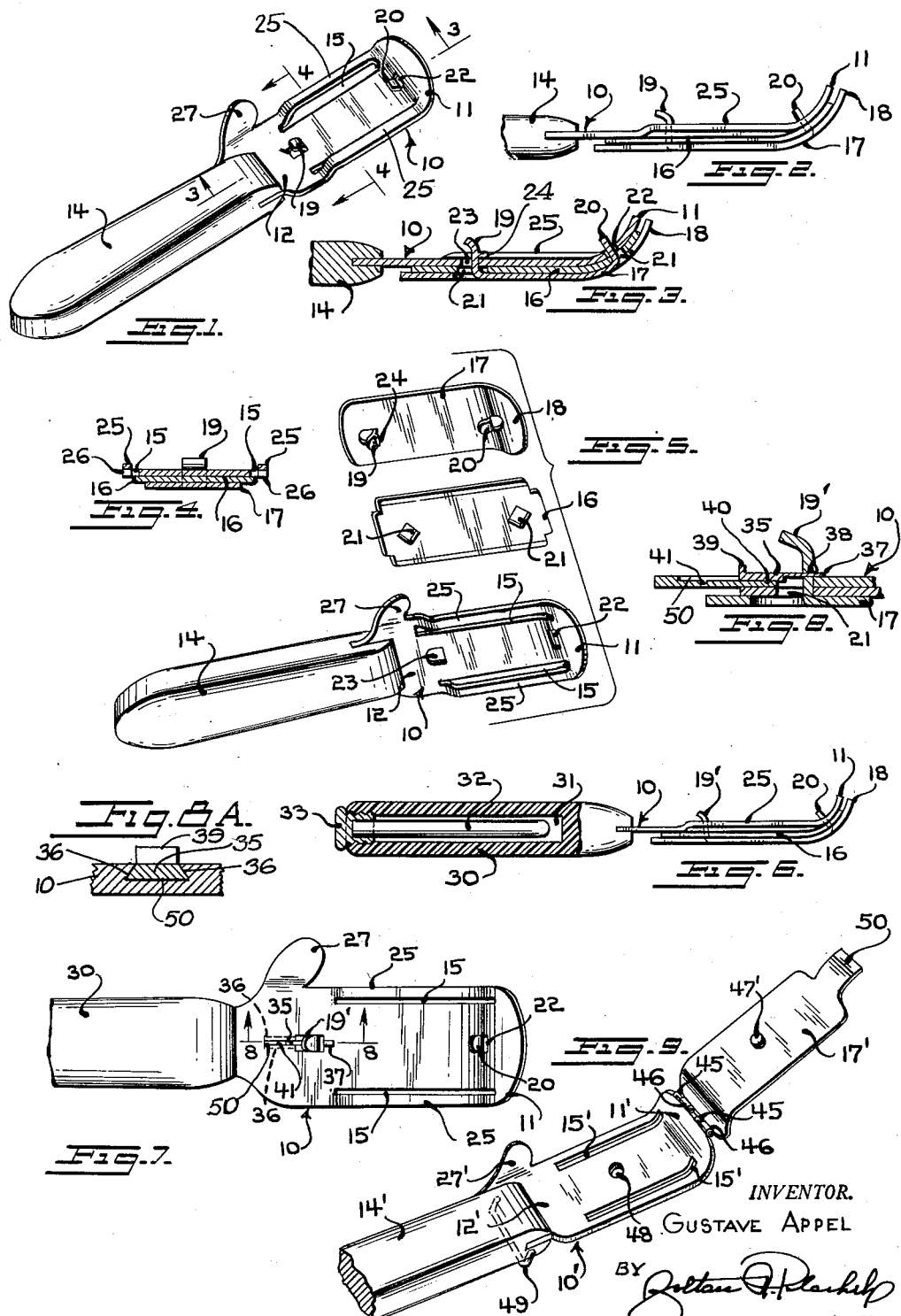
INVENTOR.
GUSTAVE APPEL Patented Nov. 14, 1950

2,530,216

UNITED STATES PATENT OFFICE 2,530,216

CORN AND CALLOUS REMOVER

Gustave Appel, New York, N. Y.

Application June 26, 1945, Serial No. 601,595

5 Claims. (Cl. 30—27)

1

This invention relates to new and useful improvements in a corn and callous remover, or for underarm shaving.

More particularly the invention proposes an improved corn and callous remover which is characterized by a strip-like member having its outer end curved upwards and its inner end connected with a supporting handle and also having a pair of slots spaced slightly inwards from its sides for extending over the edges of a safety razor placed beneath said member. It is also proposed to provide a bottom plate for holding said razor blade against the bottom face of said member. Releasable means is also provided for holding the bottom plate in position on the member.

Still further, it is proposed to slightly bow upwards the edge portions of said strip-like member which are located between said slots and the edges of the member so as to slightly expose the edges of the razor blade so that it may be properly used.

The invention proposes to characterize the means for releasably attaching the bottom plate to the member by the fact that one of these parts is formed with lugs cooperative with complementary openings in the other of these parts and constructed so that the parts may be snapped together and so securely hold the razor blade in position.

The invention proposes to so construct and design the corn and callous remover that the strip-like member and the holding plate may be constructed of sheet metal, thermoplastic material, or other slightly flexible material.

The invention proposes the provision of a simple locking means for securely holding the bottom plate in position on said strip-like member.

Still further, it is proposed to construct a corn and callous remover as briefly explained, which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a corn and callous remover constructed in accordance with this invention.

Fig. 2 is a fragmentary side elevational view of Fig. 1.

2

Fig. 3 is a fragmentary sectional view taken on the line 3—3 of Fig. 1.

Fig. 4 is a transverse sectional view taken on the line 4—4 of Fig. 1.

Fig. 5 is a perspective view of the corn and callous remover as shown in Figs. 1 to 4 inclusive, but illustrated with the parts separated.

Fig. 6 is a side elevational view of a corn and callous remover constructed in accordance with another form of this invention, a portion thereof being broken away to disclose interior parts.

Fig. 7 is a fragmentary plan view of Fig. 6.

Fig. 8 is a fragmentary enlarged longitudinal vertical sectional view taken on the line 8—8 of Fig. 7.

Fig. 8A is an enlarged partial transverse vertical sectional view taken through the bolt-like member of the modification of the invention shown in Figs. 6 to 8.

Fig. 9 is a perspective view showing a modified form of the invention.

The corn and callous remover in accordance with this invention includes a strip-like member 10 having its outer end 11 curved upwards for safety and having its inner end 12 connected with a supporting handle 14. This strip-like member 10 is also provided with a pair of slots 15 spaced slightly inwards from its sides and adapted to extend over the edges of a safety razor 16 which is placed beneath the member 10. A bottom plate 17 for holding the razor blade 16 against the bottom face of the member 10 is associated with means by which it is releasably attached to said member 10.

The bottom plate 17 is also provided with a curved end 18 adapted to engage against and along the outer curved end 11 of the member 10. The means for holding the bottom plate 17 in position comprises a pair of lugs 19 and 20 stamped or formed from the material of the plate 17. These lugs 19 and 20 are adapted to pass through the usual openings 21 formed in the safety razor 16. The lug 20 normally engages through a complementary receiving slot 22 formed in the member 10. The lug 19 engages through a larger slot 23 also formed in the member 10. The lug 19 has a ridge-like projection 24 which is adapted to snap against one of the edges of the opening 23 for securely releasably holding the plate 17 in position.

The edge portions 25 of the strip-like member 10 which are located between the slots 15 and the edges of the member 10 are slightly bowed upwards for safety so as to provide a small space 26 for easier slicing above the edges of the razor blade 16. The strip-like member 10 is also provided with a lateral projection 27 which may be used as a thumb or finger rest so that the corn and callous remover may be better gripped when used.

The operation of the corn and callous remover may be understood from the following:

The instrument is used in the usual way, to cut corns and callouses. When desired, the razor blade 16 may be removed by forcing the plate 17 downwards. This will cause the lugs 19 and 20 to disengage from the strip-like member 10. The razor blade 16 is now free to be removed. The parts may be reassembled when desired.

In Figs. 6 to 8A inclusive, a modified form of the invention has been disclosed which is very similar to the prior form, distinguishing in several ways. The handle 30 is formed with a compartment 31 in which a styptic pencil 32 is disposed. This pencil 32 is shown mounted upon a cap 33 which is removably mounted upon the end of the handle 30. A bolt-like member 35 is slidably mounted upon the strip-like member 10. The rear end of the bolt-like member 35 is formed with beveled sides 36 and is slidably engaged in a complementary groove 50 formed in the strip-like member 10. The front end 37 of the member 35 is engageable through a keeper opening 38 formed in the lug 19'. The rear end 39 of the bolt-like member 35 is turned upwards into a handle by which member 35 may be easily moved. A small projection 40 extending from the bottom face of the bolt-like member 35 is engageable with small spaced niches 41 formed in the base wall of the groove 50 in which the bolt-like member 35 is slidably mounted. These niches 41 and projection 40 serve to hold the bolt-like member 35 in a forward operative position, or a rearward inoperative position.

In other respects this form of the invention is similar to that previously shown and like reference numerals identify like parts in each of the several views.

The operation of this form of the invention is specifically the same as the prior form. However, when needed, the styptic pencil 32 may be removed and used. When it becomes necessary to cut an exceptionally hard corn or callous, it is best to move the bolt-like member 35 forward, so as to lock the lug 19 which indirectly locks the plate 17 upon the strip-like member 10.

In Fig. 9, another form of the invention is shown in which the strip-like member 10' is provided with hook portions 45 which are adapted to engage in eye members 46 formed integral with the bottom plate 17', to form a separable hinge for turning the members 10' and 17' thereon. A locking arrangement is provided which consists of an extension portion 50, adapted to be gripped by a pivoted locking link 49 when the usual safety razor blade 16 is inserted therebetween. This blade is held from shifting by a boss or screw 47 projecting from the bottom plate 17' which may engage opening 48 in member 10'.

In other respects this form of the invention is similar to the previous forms, and similar parts may be recognized by corresponding reference numerals with an accent added.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a corn and callous remover having a strip-like member formed with a slot to be aligned with a complementary hole formed in a razor blade and a bottom plate having a lug extended through the aligned slot and hole, means on the strip-like member for retaining the lug against disengagement from the aligned slot and hole, comprising an elongated bolt-like member having the side edges of its rear end beveled, the strip-like member being formed with a groove in its top face in which the beveled rear end of said bolt-like member is slidably engaged, the lug being formed with a keeper opening on a level with the top face of the strip-like member, said bolt-like member having its front end shaped to pass through said keeper opening when said bolt-like member is slid toward the lug.

2. In a corn and callous remover having a strip-like member formed with a slot to be aligned with a complementary hole formed in a razor blade and a bottom plate having a lug extended through the aligned slot and hole, means on the strip-like member for retaining the lug against disengagement from the aligned slot and hole, comprising an elongated bolt-like member having the side edges of its rear end beveled, the strip-like member being formed with a groove in its top face in which the beveled rear end of said bolt-like member is slidably engaged, the lug being formed with a keeper opening on a level with the top face of the strip-like member, said bolt-like member having its front end shaped to pass through said keeper opening when said bolt-like member is slid toward the lug, said bolt-like member having its rear end bent upward forming a handle by which the bolt can be slid.

3. In a corn and callous remover having a strip-like member formed with a slot to be aligned with a complementary hole formed in a razor blade and a bottom plate having a lug extended through the aligned slot and hole, means on the strip-like member for retaining the lug against disengagement from the aligned slot and hole, comprising an elongated bolt-like member having the side edges of its rear end beveled, the strip-like member being formed with a groove in its top face in which the beveled rear end of said bolt-like member is slidably engaged, the lug being formed with a keeper opening on a level with the top face of the strip-like member, said bolt-like member having its front end shaped to pass through said keeper opening when said bolt-like member is slid toward the lug, and means for holding said bolt-like member in a position in which its front end will be extended through said keeper opening or in a position in which its front end will be disengaged from said keeper opening.

4. In a corn and callous remover having a strip-like member formed with a slot to be aligned with a complementary hole formed in a razor blade and a bottom plate having a lug extended through the alinged slot and hole, means on the strip-like member for retaining the lug against disengagement from the alinged slot and hole, comprising an elongated bolt-like member having the side edges of its rear end beveled, the strip-like member being formed with a groove in its top face in which the beveled rear end of said bolt-like member is slidably engaged, the lug being formed with a keeper opening on a level with the top face of the strip-like member, said bolt-like member having its front end shaped to pass through said keeper opening when said bolt-like member is slid toward the lug, the material of the strip-like member defining the bottom of said groove being formed with spaced niches, and a projection formed on the bottom face of the rear end of said bolt-like member and selectively engageable with either of said niches for holding said bolt-like member in a position in which its front end will be extended through said keeper opening or in a position in which its front end will be disengaged from said keeper opening.

5. In a corn and callous remover having a strip-like member formed with a slot to be aligned with a complementary hole formed in a razor blade and a bottom plate having a lug extended through the aligned slot and hole, means on the strip-like member for retaining the lug against disengagement from the aligned slot and hole, comprising an elongated bolt-like member having the side edges of its rear end beveled, the strip-like member being formed with a groove in its top face in which the beveled rear end of said bolt-like member is slidably engaged, the lug being formed with a keeper opening on a level with the top face of the strip-like member, said bolt-like member having its front end shaped to pass through said keeper opening when said bolt-like member is slid toward the lug, the material of the strip-like member defining the bottom of said groove being formed with spaced niches, and a projection formed on the bottom face of the rear end of said bolt-like member and selectively engageable with either of said niches for holding said bolt-like member in a position in which its front end will be extended through said keeper opening or in a position in which its front end will be disengaged from said keeper opening, said bolt-like member having its rear end bent upward forming a handle for gripping and moving said bolt-like member against the holding action of said projection when engaged with either of said niches.

GUSTAVE APPEL.

REFERENCES CITED

The following references are of record in the file of this patent:

UNITED STATES PATENTS

| Number | Name | Date |
|---|---|---|
| D. 142,845 | Dresdner | Nov. 13, 1945 |
| 332,548 | Nicholson | Dec. 15, 1885 |
| 906,488 | Crichton-Clarke | Dec. 8, 1908 |
| 1,682,462 | Alvarado | Aug. 28, 1928 |
| 1,759,607 | Dunn | May 20, 1930 |
| 1,819,742 | Dellinger | Aug. 18, 1931 |
| 2,048,565 | Rodrigues | July 21, 1936 |

FOREIGN PATENTS

| Number | Country | Date |
|---|---|---|
| 593,014 | France | May 13, 1925 |